United States Patent
Lukaczyk et al.

(10) Patent No.: US 11,927,128 B2
(45) Date of Patent: Mar. 12, 2024

(54) ROTARY MACHINE WITH HUB DRIVEN TRANSMISSION ARTICULATING A FOUR BAR LINKAGE

(71) Applicant: Lumenium LLC, Fredericksburg, VA (US)

(72) Inventors: William A. Lukaczyk, Fredericksburg, VA (US); William R. Anderson, Fredericksburg, VA (US); David Gerrish, London (GB)

(73) Assignee: Lumenium LLC, Fredericksburg, VA (US)

( * ) Notice: Subject to any disclaimer, the term of this patent is extended or adjusted under 35 U.S.C. 154(b) by 0 days.

(21) Appl. No.: 17/852,751

(22) Filed: Jun. 29, 2022

(65) Prior Publication Data

US 2022/0325661 A1 Oct. 13, 2022

Related U.S. Application Data

(63) Continuation of application No. PCT/US2021/032831, filed on May 17, 2021.
(Continued)

(51) Int. Cl.
*F02B 53/02* (2006.01)
*F01C 1/44* (2006.01)
(Continued)

(52) U.S. Cl.
CPC ............... *F02B 53/02* (2013.01); *F01C 1/44* (2013.01); *F01C 21/0836* (2013.01);
(Continued)

(58) Field of Classification Search
CPC .......... F02B 53/02; F02B 53/04; F02B 55/02; F02B 55/14; F01C 1/44; F01C 21/0836
See application file for complete search history.

(56) References Cited

U.S. PATENT DOCUMENTS

| 396,176 A | 1/1889 | Simpson |
| 613,345 A | 11/1898 | White |

(Continued)

FOREIGN PATENT DOCUMENTS

| CN | 102207006 A | 10/2011 |
| CN | 104066931 A | 9/2014 |

(Continued)

OTHER PUBLICATIONS

USPTO Non-Final Office Action issued in related U.S. Appl. No. 13/868,359, filed Jul. 26, 2013.
(Continued)

*Primary Examiner* — Audrey B. Walter
(74) *Attorney, Agent, or Firm* — DeWitt LLP; Brian R. Pollack, Esq.

(57) ABSTRACT

Rotary machines are disclosed that include, in one embodiment, a rotatable shaft defining a central axis A, the shaft having a first end and a second end. The shaft can have a first hub that defines a first gearbox disposed thereon with a plurality pivots. At least one contour also having pivots is connected to the first gearbox pivots by two linkages exterior to the first gearbox. The contour has a convex outer surface that cooperates with an inwardly facing curved surface of a housing to form a working volume. A gearbox mechanism including gears, crankshafts, bearings and connecting rods creates an oscillatory motion 2 times per revolution in the linkages such that the contour is forced to navigate about the arcuate cavity without contacting the cavity at a high rate of rotating speed.

18 Claims, 6 Drawing Sheets

Related U.S. Application Data

(60) Provisional application No. 63/025,790, filed on May 15, 2020.

(51) Int. Cl.

| | | |
|---|---|---|
| F01C 21/08 | (2006.01) | |
| F02B 53/04 | (2006.01) | |
| F02B 55/02 | (2006.01) | |
| F02B 55/14 | (2006.01) | |

(52) U.S. Cl.
CPC .............. *F02B 53/04* (2013.01); *F02B 55/02* (2013.01); *F02B 55/14* (2013.01)

(56) References Cited

U.S. PATENT DOCUMENTS

| | | | |
|---|---|---|---|
| 777,692 | A | 12/1904 | Phifer |
| 1,970,004 | A | 8/1934 | Freidell |
| 2,277,225 | A | 3/1942 | Green |
| 2,919,062 | A | 12/1959 | Tryhom |
| 3,108,579 | A | 10/1963 | Korf |
| 3,186,385 | A | 6/1965 | Walker |
| 3,187,507 | A | 6/1965 | Artajo |
| 3,245,389 | A | 4/1966 | Korf |
| 3,259,113 | A | 7/1966 | Hamada |
| 3,289,654 | A | 12/1966 | Geiger |
| 3,295,505 | A | 1/1967 | Jordan |
| 3,302,870 | A | 2/1967 | Schell |
| 3,405,692 | A | 10/1968 | Paschke |
| 3,563,680 | A | 2/1971 | Jehle |
| 3,636,930 | A | 1/1972 | Okada |
| 3,855,977 | A | 12/1974 | Statkus |
| 3,884,600 | A | 5/1975 | Gray |
| 3,936,250 | A | 2/1976 | Mrlik |
| 3,981,645 | A | 9/1976 | Herzner |
| 4,055,156 | A | 10/1977 | Salguero |
| 4,144,866 | A | 3/1979 | Hakner |
| 4,850,447 | A | 7/1989 | Hirakushi |
| 5,380,177 | A | 1/1995 | Leroy et al. |
| 5,494,014 | A | 2/1996 | Lobb |
| 5,540,199 | A | 7/1996 | Penn |
| 5,681,157 | A | 10/1997 | Wen-Ming |
| 6,120,272 | A | 9/2000 | Gillardo |
| 6,129,068 | A | 10/2000 | Wingate, Jr. |
| 6,758,188 | B2 | 7/2004 | Woolridge |
| 7,051,698 | B2 | 5/2006 | Ollis |
| 7,621,255 | B2 | 11/2009 | Bowley |
| 8,733,317 | B2 | 5/2014 | Herbruck |
| 9,376,914 | B2 | 6/2016 | Vading |
| 10,184,392 | B2 | 1/2019 | Lukaczyk et al. |
| 2003/0188711 | A1 | 10/2003 | Chou |
| 2004/0011320 | A1 | 1/2004 | Woolridge |
| 2006/0210419 | A1 | 9/2006 | Chadwick, II |
| 2010/0242897 | A1 | 9/2010 | Woolridge |
| 2012/0031369 | A1 | 2/2012 | Ki |
| 2016/0298536 | A1 | 10/2016 | Lukaczyk et al. |

FOREIGN PATENT DOCUMENTS

| | | |
|---|---|---|
| DE | 2047732 A1 | 3/1972 |
| DE | 2853930 A1 | 6/1980 |
| DE | 3236811 A1 | 5/1984 |
| EP | 1092838 A1 | 4/2001 |
| EP | 1534943 | 1/2004 |
| FR | 1446480 A | 6/1966 |
| FR | 2234460 A1 | 1/1975 |
| FR | 2250892 A1 | 6/1975 |
| GB | 1454329 A | 11/1976 |
| IN | 255824 A1 | 3/2013 |
| JP | 47-16570 | 5/1972 |
| JP | 56-18772 B1 | 5/1981 |
| JP | 61-210228 A | 9/1986 |
| JP | 63-065665 A | 3/1988 |
| JP | 06-329675 A | 11/1994 |
| JP | 2002-188454 A | 7/2002 |
| JP | 4763829 B2 | 8/2011 |
| RU | 2158834 C1 | 11/2000 |
| RU | 2293848 C2 | 2/2007 |
| WO | 2002/052125 A1 | 7/2002 |
| WO | 2004/007926 A1 | 1/2004 |
| WO | 2004070169 A1 | 8/2004 |
| WO | 2010/111557 A2 | 9/2010 |
| WO | 2010/128776 A2 | 11/2010 |
| WO | 2016168320 A1 | 10/2016 |
| WO | WO-2019168405 A1 * | 9/2019 .............. F01C 1/324 |
| WO | 2020113109 A1 | 6/2020 |
| WO | 2021232025 A1 | 11/2021 |

OTHER PUBLICATIONS

USPTO Final Office Action issued in related U.S. Appl. No. 13/868,359, filed Dec. 16, 2013.
International Search Report in related international application No. PCT/US2003/014906, dated Aug. 7, 2003.
International Preliminary Examination Report in related international application No. PCT/US2003/014906, dated Dec. 20, 2004.
Supplementary European Search Report in related European application No. 03731157, completed Jul. 6, 2009.
Decision of Refusal in related JP patent application No. 2004-521437, dated Aug. 25, 2009.
European Communication pursuant to Article 94(3) EPC in related EP patent application No. EP 03731157.8, dated Oct. 21, 2009.
Notice of Office Action in related Korean application No. 7021723/2004, dated May 11, 2010.
First Examination Report in related Indian patent application 2959/CHENP/2004 (In Patent No. 255824), dated Jan. 23, 2012.
International Search Report in related international application No. PCT/US2010/028754, dated Mar. 26, 2012.
International Preliminary Report on Patentability and Written Opinion in related international application No. PCT/US2010/028754, dated Apr. 17, 2012.
USPTO Non-Final Office Action issued in related U.S. Appl. No. 12/732,160, dated Nov. 23, 2012.
USPTO Final Office Action issued in related U.S. Appl. No. 12/732,160, dated Mar. 27, 2013.
Notice of Reasons for Rejection in related JP patent application No. 2004-521437, dated Dec. 2, 2008.
International Preliminary Report on Patentability in related international application No. PCT/US2013/030649, dated Sep. 16, 2014.
Written Opinion of the International Searching Authority in related international application No. PCT/US2013/030649, dated Aug. 15, 2013.
EPO. Extended European Search Report for related European Patent Application No. 16780640.5, dated Nov. 9, 2018, 8 pages.
International Search Report and Written Opinion in International Application No. PCT/US2016/027317, dated Aug. 18, 2016.
CNIPA. Search Report dated Mar. 26, 2019, for related Chinese Patent Application No. 201680034430.2, 4 pages.
International Search Report for PCT/US 2021/032831, dated Aug. 10, 2021.
Written Opinion of the International Searching Authority for PCT/US 2021/032831, dated Aug. 10, 2021.
English translation of Office Action dated Mar. 18, 2020 in Chinese counterpart application No. 201680034430.2.
International Search Report dated Feb. 27, 2020 in International Application No. PCT/US2019/063762.
Written Opinion of the International Searching Authority dated Feb. 27, 2020 in International Application No. PCT/US2019/063762.

* cited by examiner

ROTARY MACHINE WITH HUB DRIVEN TRANSMISSION ARTICULATING A FOUR BAR LINKAGE

CROSS-REFERENCE TO RELATED APPLICATIONS

The present patent application is a continuation of and claims the benefit of priority to International Patent Application No. PCT/US21/32831, filed May 17, 2021, which in turn claims the benefit of priority to U.S. Provisional Patent Application No. 63/025,790, filed May 15, 2020. This patent application is related to Patent Application No. PCT/US19/63762, filed Nov. 27, 2019, which in turn claims the benefit of priority to U.S. Provisional Patent Application Ser. No. 62/771,961, filed Nov. 27, 2018. This patent application is also related to Patent Application No. PCT/US16/027317, filed Apr. 13, 2016, which in turn claims the benefit of priority to U.S. Provisional Patent Application Ser. No. 62/146,958, filed Apr. 13, 2015. This patent application is also related to Patent Application No. PCT/US14/56383, filed Sep. 18, 2014, which in turn claims the benefit of priority to U.S. Provisional Patent Application Ser. No. 61/879,628, filed Sep. 18, 2013. This patent application is also related to International Patent Application No. PCT/US13/30649, filed Mar. 13, 2013, which in turn claims the benefit of priority to U.S. Provisional Patent Application Ser. No. 61/697,481, filed Sep. 6, 2012, and U.S. Provisional Patent Application Ser. No. 61/610,781, filed Mar. 14, 2012. This patent application is also related to U.S. Pat. Nos. 10,184,392, 6,758,188, and 8,607,762. Each of the aforementioned patent applications and patents is incorporated by reference herein in its entirety for any purpose whatsoever.

BACKGROUND

U.S. Pat. No. 6,758,188, entitled "Continuous Torque Inverse Displacement Asymmetric Rotary Engine", the disclosure of which is incorporated herein by reference in its entirety, discloses an Inverse Displacement Asymmetric Rotary (IDAR) engine. The engine includes an inner chamber wall, an outer chamber wall, and a movable contour. U.S. patent application Ser. No. 12/732,160, filed Mar. 25, 2010, which is also incorporated by reference herein in its entirety, presents improved embodiments vis-à-vis the embodiments of U.S. Pat. No. 6,758,188. The U.S. Pat. No. 10,184,392 also discloses a rotary engine that includes further improvements. The present disclosure provides significant improvements over these embodiments, as described herein.

SUMMARY

The disclosed embodiments improve upon and add to embodiments described in the patents and patent applications referenced above. In some aspects, the present disclosure provides the following features:

In some implementations, the disclosure provides a rotary machine to combust an air-fuel mixture that releases chemical energy and produces usable work at a rotating shaft. The rotary machine can include a fixed housing with an oval like shape (or other suitable shape), and a central or main shaft with gears. The machine can provide for two, three or four combustion events per revolution in a very compact space.

In some implementations, the device can further include combustion contour components which have the side opposite the combustion chamber containing support structures including one or more pivoting linkages. The contours are in close proximity to a central rotatable gear box attached to the central or main shaft which is rotated. Two large bearings (e.g., either ball, roller or oil film, for example) are provided to support the rotating main shaft including the gear box, linkages and contours. Reciprocation of the contours are guided by articulating the linkage(s) that contact the underside of the contour at pivoting axis and are supported by the gearbox. Power transfer is realized from the combusting a fuel-air mixture in the working volume and imparting pressure on the contour. The contour then imparts a force on the supporting pivoting linkages and then into the gear box structure which is bonded to the main shaft. The rotary power is received directly from the main shaft. The combustion cycle can be either spark ignited ("SI") or compression ignited ("CI").

Induction and exhaust can be achieved through ports without valves on the fixed housing. Auxiliary chambers can be provided to prevent cross contamination of adjacent working volumes. Lower friction and better working volume sealing can be achieved by using wheels with "frictionless" bearings and cam profiles to control the motion of contours.

The disclosure further provides improved systems for creating the controlled reciprocation motion with the use of gears, chains, belts, crankshafts, and/or connecting rods, as appropriate. Oil for fluid cooling and lubrication can be provided for temperature regulation of the rotary machine, and rotary fluid couplings can be provided to allow the fluid to enter and exit the gearbox. Moreover, improved geometries are provided for mitigating oil consumption.

In accordance with an additional aspect, the present disclosure provides a rotary machine that has a central gearbox transmission that forcibly articulates cyclical motion to permit a contour to circumnavigate through a stationary oval like center housing without touching the interior surface of the stationary center housing.

In accordance with an additional aspect, the present disclosure provides a rotary machine that uses a combination of a stationary driver gear and orbiting driven gears and crank shafts with connecting rods to forcibly articulate cyclical motion for a contour to travel within a stationary center housing without touching the interior curved surface.

In accordance with an additional aspect, the present disclosure provides a gearbox that revolves inside a stationary oval like housing that contains bearings that supports the gearbox rotation and the gearbox that has linkages that connect to contours in a trapezoidal like way.

In accordance with an additional aspect, the present disclosure provides a rotary machine that uses a combination of stationary driver gear and orbiting driven gears and crank shafts with connecting rods to forcibly articulate cyclical motion of axle shafts that is rigidly connected to a swinging linkage that is connected to a contour such that the contour travels within a stationary center housing without touching the interior curved surface.

In accordance with an additional aspect, the present disclosure provides a rotary machine wherein said axle shafts include crank arms rigidly attached thereto and crank arms in a lubricated gearbox, with the same axle shaft protruding out of gearbox in two places of the gearbox with shaft seals preventing lubricant from leaking out of the gearbox.

In accordance with an additional aspect, the present disclosure provides a rotary machine that uses a combination of a stationary driver gear and orbiting driven gears and crank shafts with connecting rods to forcibly articulate the necessary cyclical motion of two linkages connected between a centrally rotating gearbox and a contour such that a fluid can be forced through passageways out to and back from the contour without leaking such that it cools and lubricates all the material it passes along the way.

In accordance with an additional aspect, the present disclosure provides a rotary machine that uses a combination of a stationary driver gear and orbiting driven gears and crank shafts with connecting rods inside a centrally rotating gearbox that forcibly articulates the necessary cyclical motion of two or more linkages connected between the rotating gearbox and a multiplicity of contours so that an internal fluid can be collected and pressurized within the rotating gearbox by internal pump or pumps.

In accordance with an additional aspect, the present disclosure provides a rotary machine wherein the internal fluid is used to lubricate and cool the contours, internal parts and/or external stationary parts.

In accordance with an additional aspect, the present disclosure provides a rotary machine wherein the internal fluid is filtered by an externally located filter and cooled with a fluid to fluid or fluid to air heat exchanger.

In accordance with an additional aspect, the present disclosure provides a rotary machine that uses a combination of a stationary driver gear and orbiting driven gears and crank shafts with connecting rods to forcibly articulate the necessary cyclical motion of two or more linkages connected between a centrally rotating gearbox and one or more contours such that a working volume is created for the purpose of operating as an internal combustion engine or as a compressor.

In accordance with an additional aspect, the present disclosure provides a rotary machine wherein the machine is configured to inject fuel directly into the working volume after the intake port closes and before the minimum volume point.

In accordance with an additional aspect, the present disclosure provides a rotary machine wherein the machine is an internal combustion engine operable by spark ignition.

In accordance with an additional aspect, the present disclosure provides a rotary machine wherein the machine is an internal combustion engine operable by compression ignition.

In accordance with an additional aspect, the present disclosure provides a rotary machine that includes a multiplicity of floating seals that bridge the gap between the moving contour and the stationary center housing to prevent gases from leaving the working volume.

In some implementations, the disclosure provides a rotary machine that includes a housing defining an inwardly facing continuously curved surface, front and rear side plates attached to the housing, a central shaft defining a central axis A, the shaft having a first end and a second end, a first hub disposed on the central shaft, the first hub having a body with a volume generally defined between front and rear surfaces that are spaced apart along the central shaft, at least a portion of the first hub being situated axially between the front and rear side plates, and at least one contour assembly pivotally to the first hub in a plurality of discrete locations, the at least one contour assembly being defined at least in part by a convex radially outwardly facing surface, the convex radially outwardly facing surface of the at least one contour assembly, front and rear side plates and the inwardly facing continuous curved surface of the housing cooperating to form at least one working volume that changes in volume as the central shaft rotates about the central axis A.

In some implementations, the at least one contour assembly can be coupled to the first hub by way of a plurality of linkages, a radially inward end of each linkage of the plurality of linkages being pivotally coupled to the first hub, and a radially outward end of each linkage of the plurality of linkages being pivotally coupled to the at least one contour assembly. The radially inward end of one of the linkages can be coupled to a crank arm. The crank arm can be coupled to a crankshaft that is distinct from the central shaft, the crankshaft having a center of rotation that is disposed radially outwardly with respect to the central shaft. The crankshaft can include gear teeth that mesh with a central gear that surrounds the central shaft.

In some implementations, the central gear can be stationary with respect to the housing. The rotary machine can be configured to forcibly articulate cyclical motion to cause the at least one contour assembly to circumnavigate through a constrained orbit while maintaining a predetermined spacing between the convex radially outwardly facing surface of the contour assembly and the inwardly facing continuously curved surface of the housing. The central shaft can be coupled to the hub, wherein the hub includes a first gearbox and further wherein the central shaft and first gearbox rotate as a single unit. The hub can include a first gearbox that in turn comprises a transmission that forcibly articulates cyclical motion to permit the at least one contour assembly to circumnavigate through a stationary oval like center housing without touching the interior surface of the stationary center housing. If desired, the rotary machine can include a combination of a stationary driver gear and orbiting driven gears and crank shafts with connecting rods to forcibly articulate cyclical motion for the at least one contour assembly to travel within a stationary center housing without touching the interior curved surface.

In some implementations, the hub can include a first gearbox that is coupled to the at least one contour assembly by a plurality of links in a trapezoidal arrangement. If desired, the rotary machine can include a combination of a stationary driver gear and orbiting driven gears and crank shafts with connecting rods to forcibly articulate cyclical motion of axle shafts that are rigidly connected to a swinging linkage that is connected to the at least one contour assembly such that the at least one contour assembly travels within a stationary center housing without touching the interior curved surface. If desired, the axle shafts can include crank arms rigidly attached thereto and crank arms in a first gearbox defined by the first hub, with the same axle shaft protruding out of the first gearbox in two locations of the first gearbox with shaft seals preventing lubricant from leaking out of the gearbox. If desired, the rotary machine can include a plurality (e.g., 2, 3, 4) of contour assemblies coupled to the first hub.

In some implementations, the first hub can be configured to collect and pressurize fluid within the first hub by way of at least one internal pump. For example, the fluid can be used to lubricate and cool the plurality of contour assemblies.

In some implementations, the rotary machine can be an internal combustion engine or as a compressor. If desired, the rotary machine can be configured to inject fuel directly into the working volume after the intake port closes and before the minimum volume point. In further embodiments, the rotary machine can be an internal combustion engine operable by spark ignition. The rotary machine can be an internal combustion engine operable by compression ignition.

In some implementations, the rotary machine can further include a multiplicity of floating seals that bridge the gap between the at least one contour assembly and a housing to prevent gases from leaving the working volume.

In further implementations, the at least one contour assembly can be coupled to the first hub at least in part by a plurality of bearings arranged parallel with respect to each other, each of the bearings being movably disposed on a pin.

It is to be understood that both the foregoing general description and the following detailed description are exemplary and are intended to provide further explanation of the embodiments disclosed herein.

The accompanying drawings, which are incorporated in and constitute part of this specification, are included to illustrate and provide a further understanding of the methods and systems of the disclosure. Together with the description, the drawings serve to explain the principles of the disclosed embodiments.

BRIEF DESCRIPTION OF DRAWINGS

Accompanying the description are plural images illustrating the disclosed embodiments, which represent non-limiting, examples and in which.

DETAILED DESCRIPTION OF THE DISCLOSED EMBODIMENTS

Figure 1:
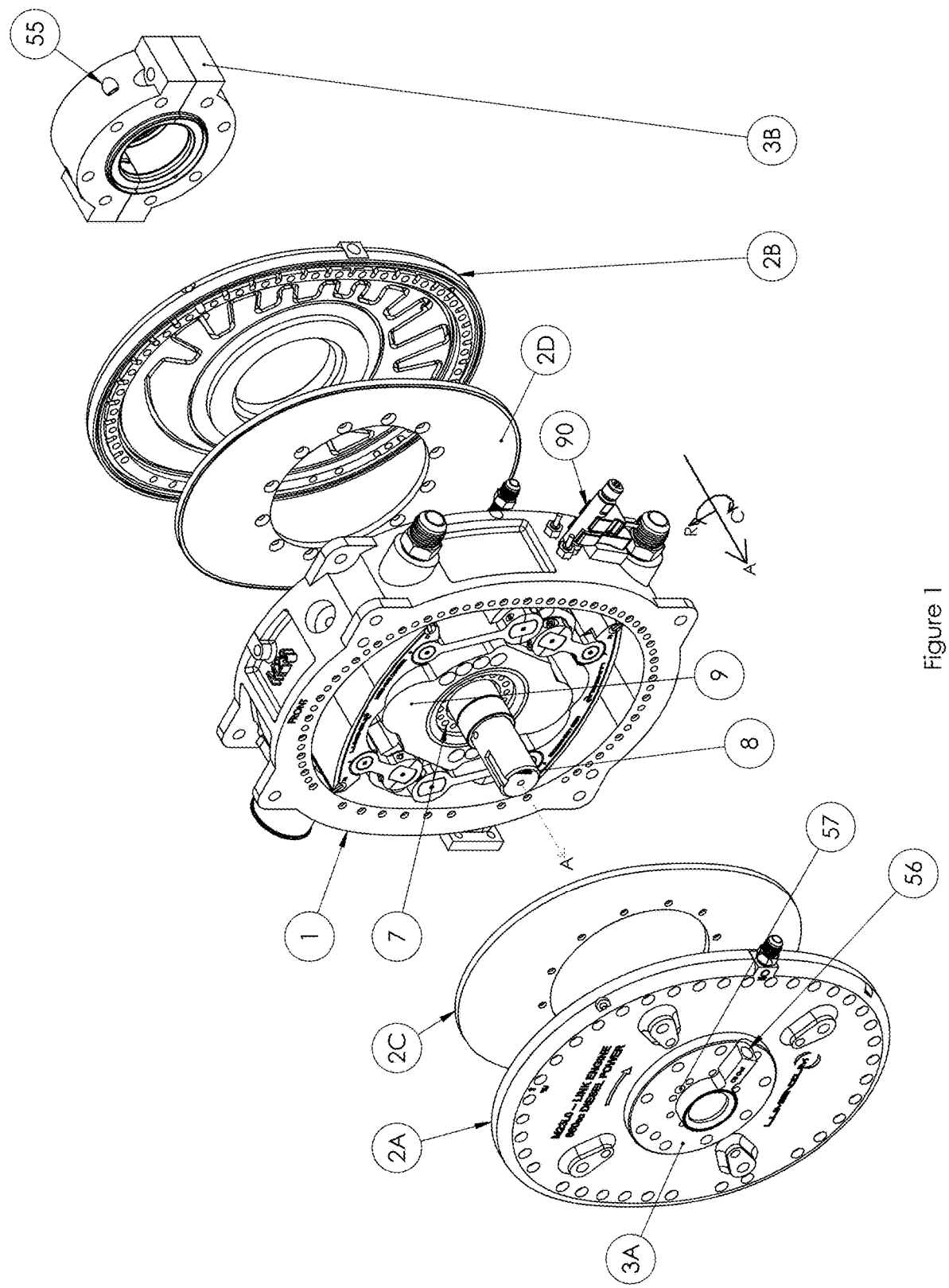
FIG. 1 is an isometric view of an embodiment of a rotary machine in accordance with the disclosure showing cover plates removed from the engine, depicting an inner face of the cover plate and an isometric view of the engine components.

Referring to FIG. 1, components are illustrated which form an illustrative implementation in accordance with the present disclosure. In addition, a coordinate system is illustrated which will be utilized for discussing the disclosed embodiments. This coordinate system is a cylindrical, three dimensional system, consisting of axial (A), radial (R) and circumferential (C) axes.

As illustrated in FIG. 1, a fixed housing center section 1 has fixed thickness and its interior represents one of the internal surfaces of the working volume. The center section 1 includes an annular, oval shaped housing that is defined by a peripheral, annular wall having a generally oval projection when viewed from either end. The annular wall defines an inner surface that cooperates with side plates of the housing and an outwardly facing surface of each contour assembly to define a working volume, described in further detail below. This center section 1, is held by subsequent sections that are bolted to it. Any such sections can have mounting features, such as flanges and the like to affix the machine to a supporting structure. For the example shown in FIG. 1 or 5, the mountings are the lower flange.

Working out from the center of the device, the stationary center section 1 as shown in FIG. 1, has two flat, parallel peripheral faces of a generally oval annular shape that are in turn detachably mated to two separate front 2A and rear 2B side plates. The mechanical interface of the parts, has features (e.g., seals, gaskets and the like) that make the joint gas tight. Side plates 2A and 2B help define part of the working volume's 6, internal surfaces. Each side plate 2A and 2B can each be one unitary part or can consist of two sub parts. As two parts, 2C and 2D being a wear surface insert including very hard material that is mated to primary plate 2A and 2B, but these can also be integral. Next attached to the side plates 2A and 2B are bearing supports Front 3A and Rear 3B. The bearing support holds either oil film, roller, needle or ball bearings and the like that support the main shaft 8. Bearing supports 3A and 3B have surface features such that a composite oil seal can be used to keep oil from leaking out and allow for the transfer of fluid to the inner rotating assembly.

Figure 2:
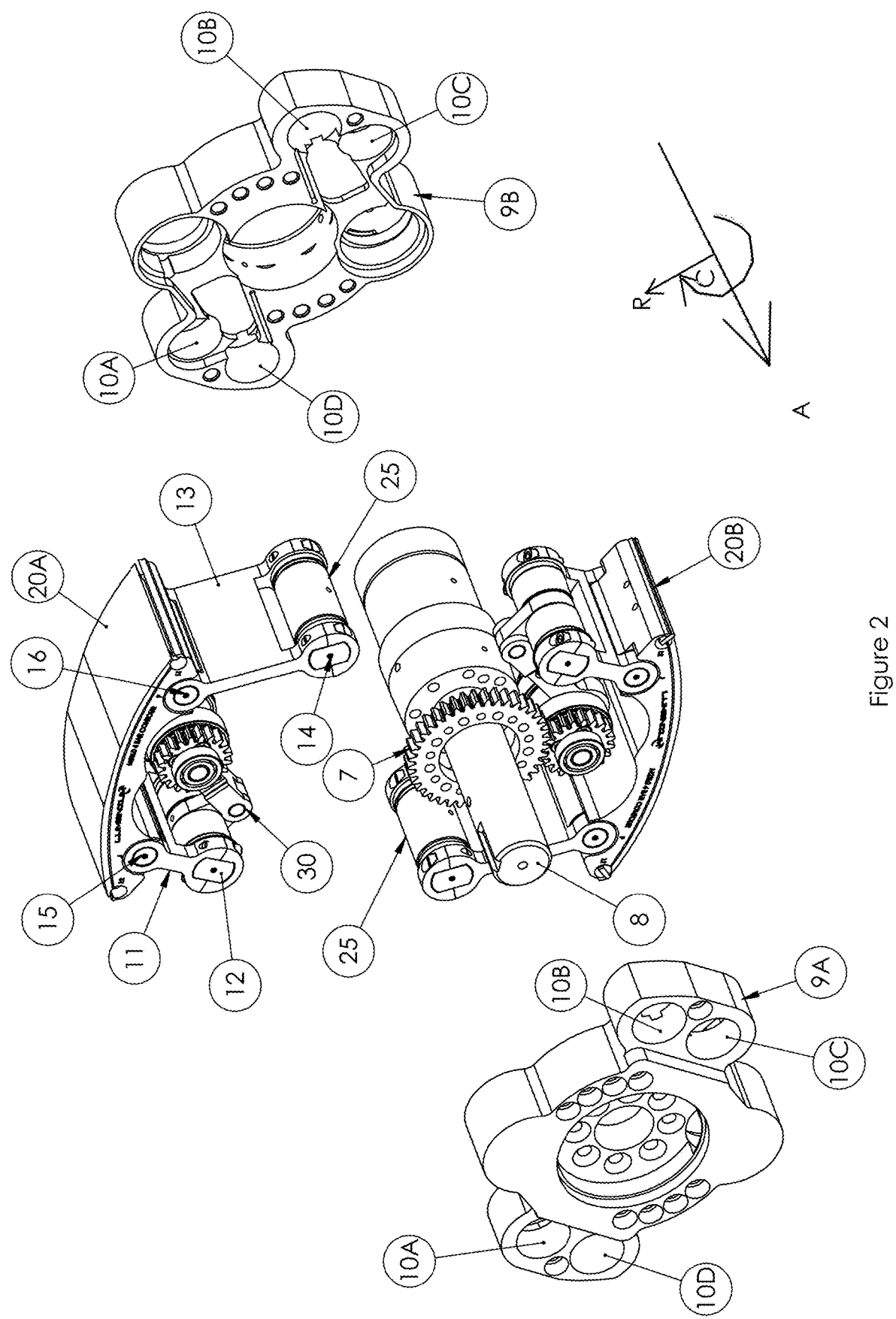
FIG. 2 is an isometric exploded view of an internal hub and gearbox assembly of the embodiment of FIG. 1 illustrating front and rear portions of the hub, as well as contours, linkages, connecting rods and associated hardware components.

FIG. 2, shows an exploded view of the rotating parts of the device. The main shaft 8 is supported by the bearings of the roller, ball or oil film type. Said bearings support rotatable shaft 8. A stationary gear 7, is attached to the inward facing end of the bearing support 3A such as via bolts or a spline that are directed through aligned holes in the gear 7 and the support 3A and juts into the gear box housing 9.

Rotatable shaft 8 has mounted on it in a fixed angular displacement central gear box 9 that rotates on the same axis "A" as the shaft 8 as shown in FIGS. 1 and 2. Gearbox 9, is approximately the same or slightly less than the thickness (measured along axis A) of center section 1. Gearbox, 9 is shown as having two mateable housing portions 9A and 9B to allow assembly and for rotatably supporting components within the gearbox 9. However, gearbox 9 could be a single main unit with access ports instead of two halves. Gearbox 9 is disposed between side plates 2A and 2B as shown in FIG. 1. Alternatively, gearbox 9 could be merged with shaft 8 as one or more subparts to make a whole rotating gearbox with integral shafts. FIG. 2 illustrates how gearbox 9 has an outer peripheral surface defined in part by a plurality of pivoting axis holes 10A, 10B, 10C and 10D. These are treated as pairs. While two pairs of pivot (10A & B, 10C & D) holes are illustrated, any suitable number pairs of pivots can be provided, depending on the design of the engine. For example, one, two, three or four such pivot pairs can be provided, wherein each such pivot pair has corresponding mechanical components as discussed herein below. Each half of the gearbox also defines a central opening for the main shaft, and an upper and a lower journal to receive crankshafts that are coupled by a geared connection the central gear 7.

As illustrated in FIG. 2, a linkage 11, pivots about hole 10A held by axle pin 12. Linkage 13 pivots about hole 10B held by axle pin 14. Linkages 11 and 13 are almost as wide but less than the width of the center section 1. Both 11 and 13 have two yoke attachments to firmly hold the linkage to the axle pins in fixed angular orientation. Illustrated are "Double D" holes, but it will be appreciated that other arrangements can be used.

At the other end of linkages 11 and 13 are two more axle pins, 15 and 16 which provide connection to the contour 20A, 20B and angular rotation of the linkages at the contour 20 pivot points.

Figure 4:
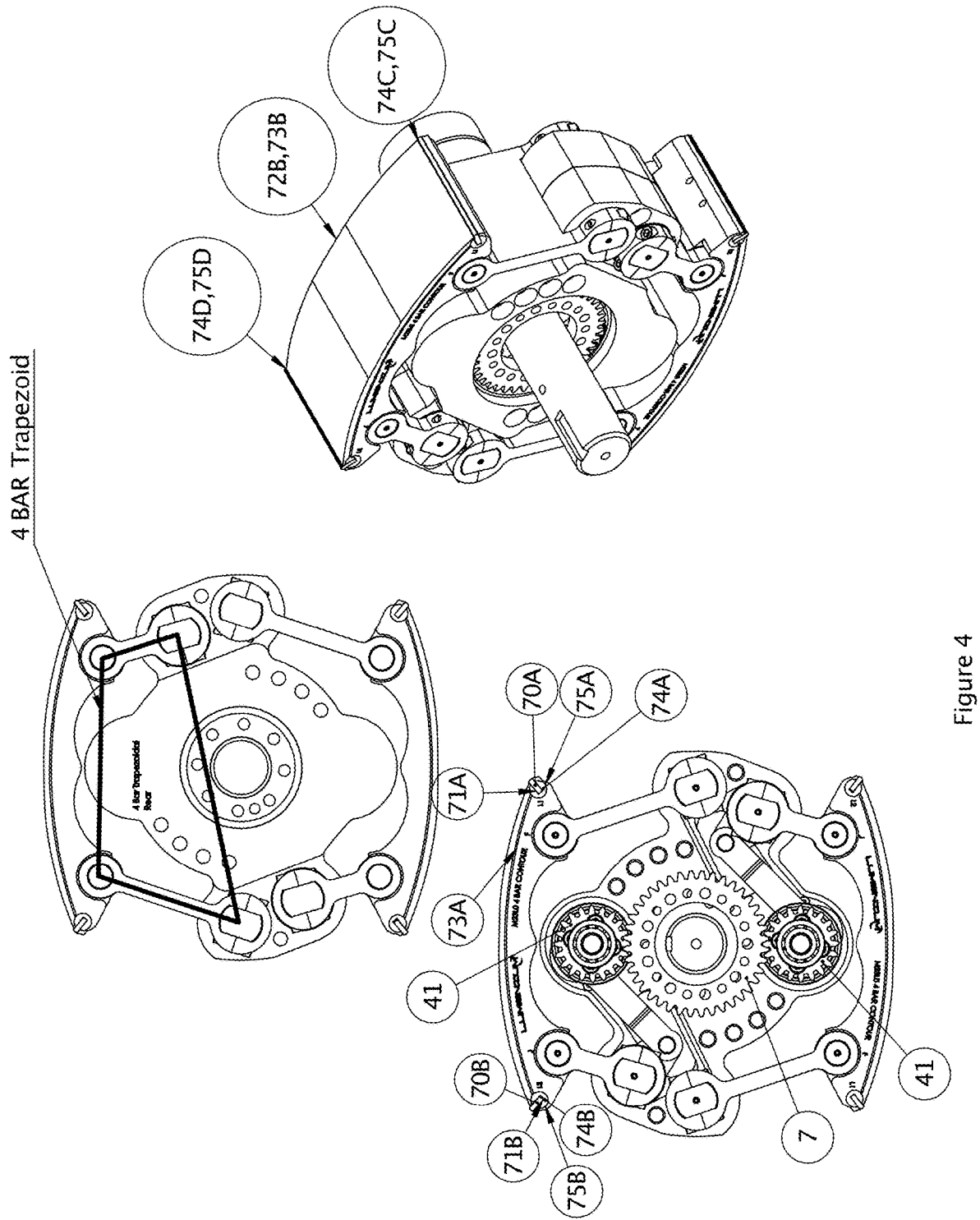
FIG. 4 shows an illustration of the 4 bar geometry, and floating seals of the illustrated embodiment.

A trapezoidal shape is formed consisting of 4 lines or bars connecting the centers of 4 pivoting axles of 12, 14, 16 and 15. Hence this arrangement is referred to herein as a four bar mechanism as shown in FIG. 4.

When the Linkages 11 and 13 are allowed to pivot about holes 10A and 10B of gearbox 9 in a synchronous manner with the full rotation of main shaft 8, and furthermore cause pivoting of axle pins 15 and 16 in contour 20, a unique, oscillatory motion is caused in contour 20 which allows contour 20 to circumnavigate the oval like interior shape of Center section 1, without colliding with it.

Figure 3:
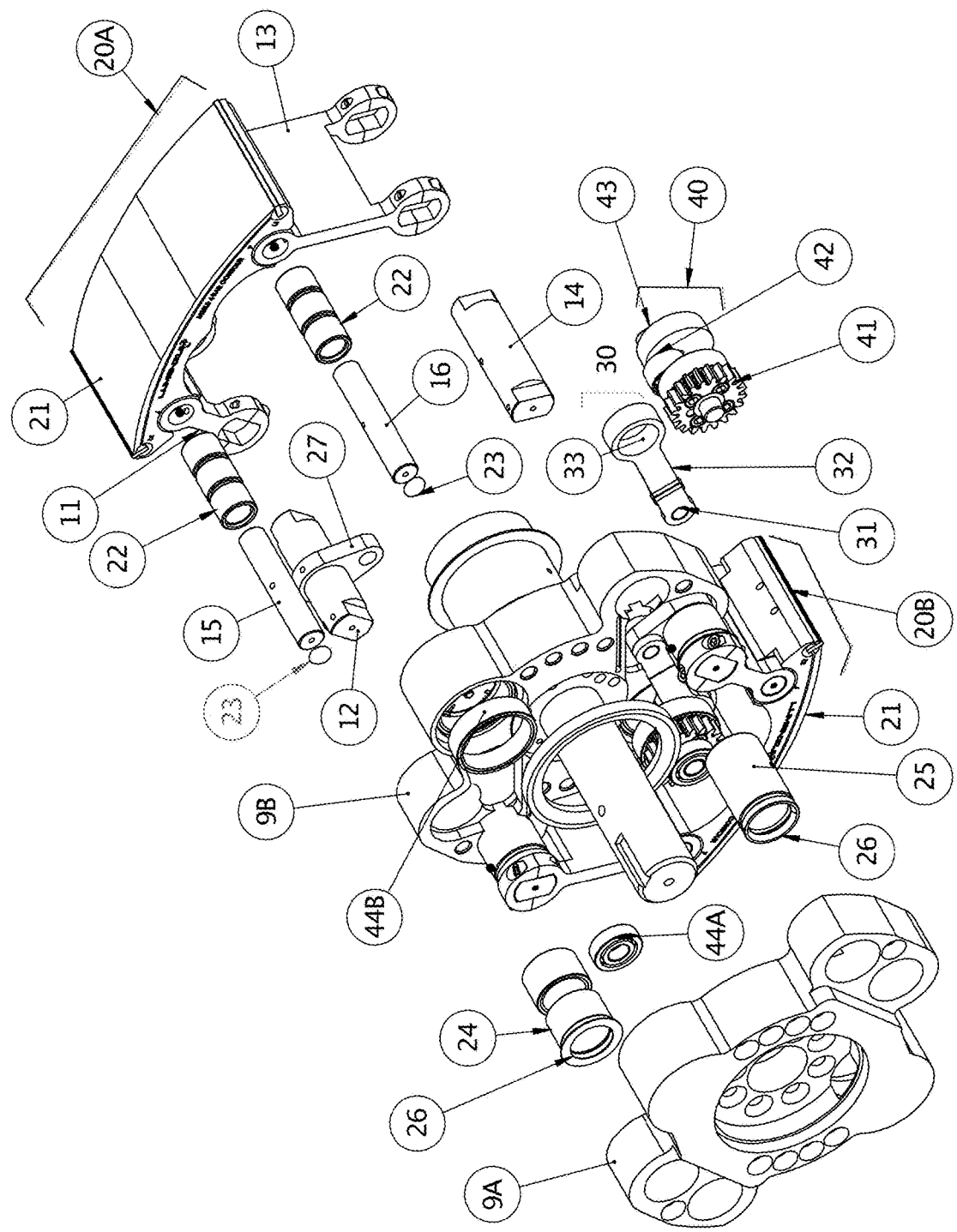
FIG. 3 is an isometric view of a rotating Gearbox assembly of the embodiment of FIG. 1 showing one contour removed from the assembly and showing associated articulating axis bearings that transmit force from the contour to linkage and the linkage to the hub. It also shows internal crankshafts and connecting rods that cause the articulation.

This embodiment shows two contour assemblies 20A, B. They are illustrated as being identical although that is not necessary. Two contour assemblies 20 (also referred to herein as "contours"), are shown in FIG. 3. Each one includes a contour upper body 21 having an outer convex arcuate surface and two large holes for the purpose of containing bearings 22. Bearings 22 may also be integral to the material of 21 if the holes are formed of a wear resistant surface. Two axle pins or rods, 15, 16 are to be inserted into these bearings or holes. The axle pins may be drilled for lubricant to pass through them. The contour 20 will also have compliant shaft oil seals 23 to prevent lubricant from leaking along the axles 15 and 16 and out. Not described here, but illustrated are locations and workings for floating seals that retain the working gasses in volume 6.

Below the contour assemblies 20 of FIG. 3 and affixed to the axle pins 15 and 16 are wide linkages 11 and 13. These linkages may also have cross holes within them to provide for flow of lubricant to be transferred to or from the axle pins. The linkages support and resist the loads caused by intake vacuum, compression, combustion, exhaust and centripetal force.

In the gearbox housing 9, shown as halves A and B, are bearings 24 and 25. Bearing 24 may be split into two portions (e.g., halves) to allow crank arm passage. Axles 12 and 14 are inserted into these bearings 24 and 25. At the exposed ends of the bearings there are also shaft seals 26 to prevent the leakage of lubricant out along the shafts. Linkages 11 and 13 are respectively attached to axles 12 and 14 in a rigid manner.

To create the reciprocating motion of contour 20 axle 12 is forced to rotate in an oscillatory manner. Affixed to axle pin 12 is crank arm 27. Through the hole at the end of crank arm 27 is attached the pin 31, of connecting rod assembly 30.

Connecting rod assembly 30 consists of pin 31, rod 32 and bearing 33. The crankshaft assembly 40 includes a gear 41, an offset pin 42, a rear shaft 43, and two end support bearings 44A and 44B that are received in journals defined in the upper and lower portions of the gearbox 9 (as illustrated). The crank shaft is made to be disassembled so that the offset pin 42 can be inserted into bearing 33 of the connecting rod. Alternatively, the crankshaft can be made as one piece and the connecting rod bearing end can be separated to encircle the crankshaft pin.

When the gearbox 9 rotates about axis A, each crankshaft assembly 40 orbits about axis A within the gearbox. As the crankshaft assemblies 40 orbit, gear 41 of each assembly meshes with stationary gear 7, shown on FIG. 2, that, in this case, is bolted to bearing support 3A. The ratios of the two gears in the illustrated implementation are such that each crankshaft assembly rotates two (2) times per revolution of the gearbox 9 about axis A.

The pin 31 of connecting rod 30 goes through the hole in crank 27. The rotation of the crank shaft 40 causes the con rod 30 to push and pull on crank arm 27, thus causing axle pin 12 to rotate about hole 10A on bearings 24 but in a limited degree of oscillatory rotation. Axle pin 12 is rigidly attached to linkage 11 thus causing the rotary oscillation of the axle pin to be converted to a swinging motion of the linkage 11. The swinging of linkage 11 forces the contour through pin 15 to sweep back and forth as the whole gearbox 9 and main shaft 8 revolve about the A axis. Linkage 13 is non-operated in this version but can be force motioned in the same way.

FIG. 4 shows the core assembly that rotates (except stationary gear 7, which is attached to stationary plate 2A) inside the stationary housing. The structure of the two linkages 11, 13, a contour and a gearbox form a four bar trapezoidal geometric relationship which deforms in order to permit the device to operate as shown in FIG. 4. The timing of the gears meshing, location of crankshaft pin, connecting rod length, crank arm length, crank arm orientation, the lengths of linkages 11, 13, and locations of the four pivots permits the contour to circumnavigate the oval like interior of the housing 1 without touching it and retain a very close proximity to its inner surface.

Figure 5:
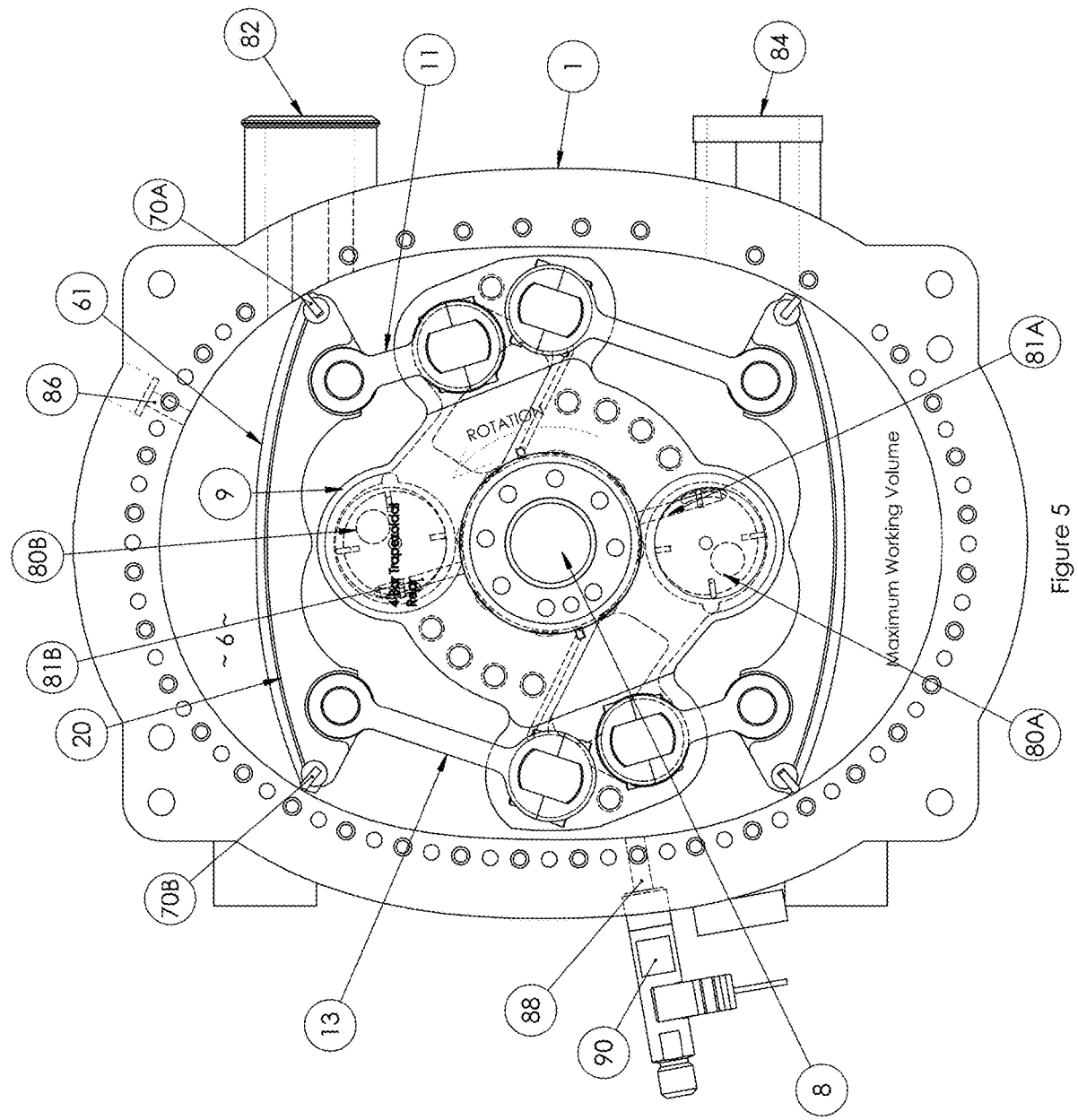
FIG. 5 is a view of the contour location when maximum working volume is present (Bottom Dead Center).
Figure 6:
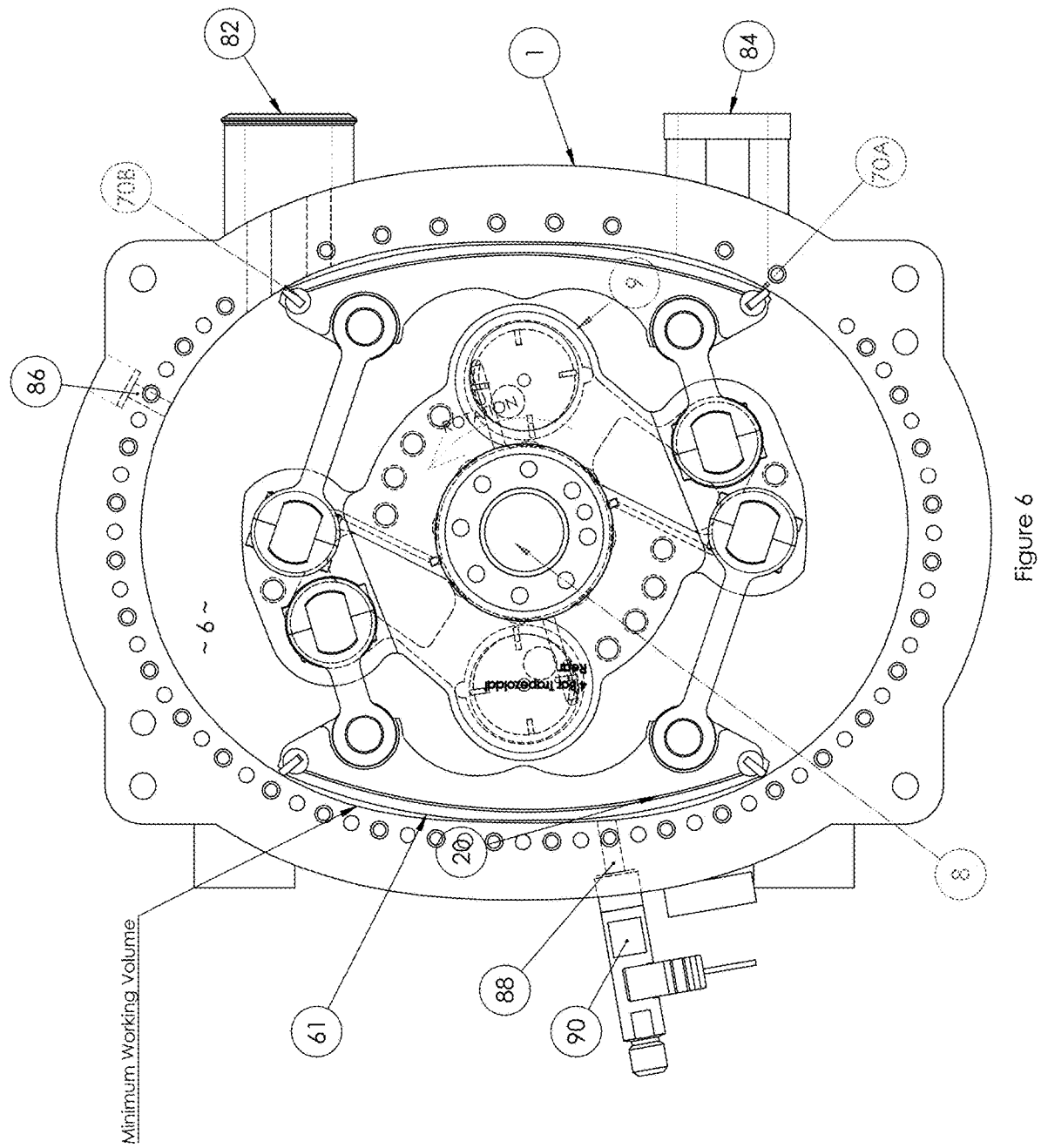
FIG. 6 is a view of the contour location when minimum working volume is present (Top Dead Center).

With reference to FIG. 5, as shaft 8 and gearbox 9 rotate about axis A (in a counter clockwise direction), and as contour 20 oscillates back and forth while being constrained by linkages 11 and 13, the inwardly facing surface of the oval like center housing 1, surfaces of front and rear side plates 2A and 2B, and the outwardly facing convex surface 61 of the contour body cooperate to define a variable working volume 6, wherein the displacement of the working volume 6 varies as the gearbox 9 rotates with the shaft 8 past and directs each contour along a counter clockwise direction past the intake port 82, wherein the movement of each contour while moving past the intake port 82 draws in a fuel-air mixture or just air and compresses it to either self-ignite (e.g., in the case of a diesel engine), or if a spark ignition, ignite approximately where the contour reaches top dead center. Thus, the rotation of shaft 8 combined with the reciprocating motion of the contours 20 forms a compound motion. In FIG. 6, the contour is facing the left side of the inwardly facing wall and is conventionally said to be at "top dead center". If desired, fuel can be directly injected via a low pressure fuel injector at the location denoted by reference 86 before the pressure builds up in the working volume. Additionally or alternatively, fuel can be injected via a high pressure fuel injector 90 at location 88, since some small volume 6 still exists at that top dead center location but the contents are now at a very high pressure. The working volume then expands and decreases again as the contour 20 passes the exhaust port 84. If spark ignition is required, a spark plug can be substituted for 90 at or near top dead center.

In order to maintain the gases within the working volume, floating seals are used to complete the closure between the contour and the interior of the central housing 1, and side plates 2A and 2B. Two Apex seals 70 A and B are used in each contour slots 71 A and B (shown in FIG. 4). Two side seals 72 A and B are inserted into slots 73 A and B. Finally 4 circular seals 74 A, B, C and D are positioned in holes 75 A, B, C, and D at the ends of the apex seals 70 A and B. These circular seals span the gap between the Apex seals 70 and the side seals 72. All the above seals have springs behind them to create a preload condition on their contact patch.

Therefore, in continuous operation, the volume of the working volume 6 for each contour 20 increases then decreases in a repetitive fashion twice per revolution, once for intake and compression, second for power and exhaust. This change in working volume as the shaft 8 and gearbox 9 rotate creates the necessary strokes of the four stroke internal combustion engine, but in a single revolution of the device, unlike the two revolutions required in a traditional piston engine.

The interior of gearbox 9 is flooded with fluid which lubricates the above described parts. The oil enters the gearbox through bearing support 3B, (FIG. 1, hole 55). Then the oil travels in a passageway within main shaft 8. Oil is first forced into the oil film bearing 25 of axle pin 14, FIG. 3. Clearance is allowed to let a significant amount of fluid to enter the center drilling of axle pin 14. Then cross drilling is provided so that the oil enters the linkage arm 13 without leaking out into the interior of housing 1. Since the oil is under pressure, typically about 50 psi, the oil will travel up the linkage 13 and into cross drilled axle pivot 16. Shaft seals at the end of all exposed shafts prevent the fluid from leaking out.

Once the oil has entered the interior of the contour 20, it will lubricate the bearings 22, on one side. Oil will be held back from leaking into the interior of center housing 1, by shaft seals 23. The oil will continue through internal passages of the contour thereby cooling the contour. After cooling the contour body, it will enter the other bearing 22, thus lubricating it, and then enter cross drilled holes in the other axle 15.

Leaving the contour through the second cross drilled axle 15, it will enter passage holes in linkage 11 and travel back toward the gearbox 9.

Oil will cross from the linkage 11 into the cross drilled axle 12. Once passing through axle 12, the oil will be released into the interior of gearbox case 9.

Once released into gearbox case 9, oil will splash around the gears, bearings and connecting rods of the interior. Centripetal force drives the oil to a pickup point where it is allowed to enter one or two internal oil pump(s) 80A or B of FIG. 5. These pumps can be but are not limited to be driven by the free end of the crankshafts.

Rotary oil vane or gearotor pump(s) 80A, B or piston oil pump(s) can capture the hot oil and pressurize it so it can be either pushed down the main shaft 8.

After traveling out internal passageway 81A or B, the fluid turns down the main shaft 8, the pressurized oil turns and goes out to an oil film bearing on the main shaft or fluidic coupler located in bearing support 3A. At this point it will go outside the engine case by way of exit hole 56, FIG. 1.

To prevent the oil from overheating, it can pass through an external filter, pressure regulator, oil cooler and surge reservoir/de-airing device. An additional external oil pump may be added to prime the system upon startup. After the external devices, oil will re-enter the engine through hole 55 of bearing support 3B.

To prevent excess pressure from building up inside gearbox housing 9, air breather holes 57, are located on bearing support 3A. These are vented to atmosphere.

The disclosed embodiments can include a multiplicity of entire engine assemblies as described above attached to one common shaft as a means to increase usable shaft horsepower. Units can be stacked along the axis A and share a common shaft 8 to increase power.

Although the present disclosure herein has been described with reference to particular preferred embodiments thereof, it is to be understood that these embodiments are merely illustrative of the principles and applications of the disclosure. Therefore, modifications may be made to these embodiments and other arrangements may be devised without departing from the spirit and scope of the disclosure.

What is claimed is:

1. A rotary machine, comprising:
   a) a housing defining an inwardly facing continuously curved surface;
   b) front and rear side plates attached to the housing;
   c) a central shaft defining a central axis A, the shaft having a first end and a second end;
   d) a first hub disposed on the central shaft, the first hub having a body with a volume generally defined between front and rear surfaces that are spaced apart along the central shaft, at least a portion of the first hub being situated axially between the front and rear side plates; and
   e) at least one contour assembly pivotally coupled to the first hub in a plurality of discrete locations, the at least one contour assembly being defined at least in part by a convex radially outwardly facing surface, the convex radially outwardly facing surface of the at least one contour assembly, front and rear side plates and the inwardly facing continuous curved surface of the housing cooperating to form at least one working volume that changes in volume as the central shaft rotates about the central axis A, wherein the at least one contour assembly is coupled to the first hub by way of a plurality of linkages, a radially inward end of each linkage of the plurality of linkages being pivotally coupled to the first hub, and a radially outward end of each linkage of the plurality of linkages being pivotally coupled to the at least one contour assembly, wherein the plurality of linkages, the first hub, and the at least one contour assembly cooperate to form a four-bar linkage, wherein the first hub includes a first gearbox that is coupled to the at least one contour assembly by the plurality of linkages in a trapezoidal arrangement.

2. The rotary machine of claim 1, wherein the at least one contour assembly is coupled to the first hub at least in part by a plurality of bearings arranged parallel with respect to each other, each of the bearings being movably disposed on a pin.

3. The rotary machine of claim 1, wherein the central shaft is coupled to the first hub, wherein the first hub includes a first gearbox and further wherein the central shaft and first gearbox rotate as a single unit.

4. The rotary machine of claim 1, wherein the first hub includes a first gearbox that in turn comprises a transmission that forcibly articulates cyclical motion to permit the at least one contour assembly to circumnavigate through the housing without touching the inwardly facing continuously curved surface of the housing.

5. The rotary machine of claim 1, wherein the rotary machine includes a combination of a stationary driver gear and orbiting driven gears and crank shafts with connecting rods to forcibly articulate cyclical motion for the at least one contour assembly to travel within the housing without touching the inwardly facing continuously curved surface.

6. The rotary machine of claim 1, wherein the rotary machine includes a combination of a stationary driver gear and orbiting driven gears and crank shafts with connecting rods to forcibly articulate cyclical motion of axle shafts.

7. The rotary machine of claim 1, wherein the rotary machine includes a plurality of contour assemblies coupled to the first hub.

8. The rotary machine of claim 1, wherein the rotary machine is an internal combustion engine or a compressor.

9. The rotary machine of claim 1, wherein the rotary machine is configured to inject fuel directly into the working volume after an intake port closes and before the at least one contour assembly reaches a minimum volume point.

10. The rotary machine of claim 1, wherein the rotary machine is an internal combustion engine operable by spark ignition.

11. The rotary machine of claim 1, wherein the rotary machine is an internal combustion engine operable by compression ignition.

12. The rotary machine of claim 1, wherein the first hub is configured to collect and pressurize fluid within the first hub by way of at least one internal pump.

13. The rotary machine of claim 12, wherein the fluid is used to lubricate and cool a plurality of contour assemblies.

14. The rotary machine of claim 1, wherein the radially inward end of one of the linkages is coupled to a crank arm.

15. The rotary machine of claim 14, wherein the crank arm is coupled to a crankshaft that is distinct from the central shaft, the crankshaft having a center of rotation that is disposed radially outwardly with respect to the central shaft.

16. The rotary machine of claim 15, wherein the crankshaft includes gear teeth that mesh with a central gear that surrounds the central shaft.

17. The rotary machine of claim 16, wherein the central gear is stationary with respect to the housing.

18. The rotary machine of claim 17, wherein the rotary machine is configured to forcibly articulate cyclical motion to cause the at least one contour assembly to circumnavigate through a constrained orbit while maintaining a predetermined spacing between the convex radially outwardly facing surface of the contour assembly and the inwardly facing continuously curved surface of the housing.

* * * * *